(12) United States Patent
Symiczek

(10) Patent No.: US 7,543,830 B2
(45) Date of Patent: Jun. 9, 2009

(54) AUTOMOTIVE DOLLY SYSTEM

(76) Inventor: Doug Symiczek, 28858 Woodcrest Lake Dr., Menifee, CA (US) 92584

( * ) Notice: Subject to any disclaimer, the term of this patent is extended or adjusted under 35 U.S.C. 154(b) by 0 days.

(21) Appl. No.: 11/849,236

(22) Filed: Aug. 31, 2007

(65) Prior Publication Data

US 2008/0100015 A1 May 1, 2008

Related U.S. Application Data

(60) Provisional application No. 60/841,611, filed on Aug. 31, 2006.

(51) Int. Cl.
*B62B 3/04* (2006.01)
(52) U.S. Cl. ............ 280/79.11; 414/426; 414/430
(58) Field of Classification Search ............ 208/79.11, 208/79.3, 79.5, 79.6, 79.7; 414/426, 427, 414/428, 429, 430
See application file for complete search history.

(56) References Cited

U.S. PATENT DOCUMENTS

| | | | | |
|---|---|---|---|---|
| 1,804,997 | A * | 5/1931 | Manley | 280/79.3 |
| 3,635,434 | A * | 1/1972 | Chartier | 248/352 |
| 3,749,265 | A | 7/1973 | Smith, Jr. | |
| 4,213,624 | A | 7/1980 | Sanders | |
| 4,460,306 | A | 7/1984 | Hawkins | |
| 4,761,984 | A * | 8/1988 | Fuscaldo, Jr. | 72/305 |
| 4,784,402 | A * | 11/1988 | Roman | 280/79.4 |
| 4,864,672 | A * | 9/1989 | Altieri et al. | 14/69.5 |
| 4,976,449 | A | 12/1990 | Lotspeich et al. | |
| 5,180,177 | A * | 1/1993 | Maki | 280/47.15 |
| 5,253,887 | A | 10/1993 | Marenger | |
| 5,933,898 | A * | 8/1999 | Estes et al. | 14/69.5 |
| 5,984,611 | A | 11/1999 | Warner | |
| 6,053,477 | A * | 4/2000 | Price | 254/94 |
| 7,300,063 | B1 * | 11/2007 | Prizmich | 280/79.4 |
| 7,328,907 | B1 * | 2/2008 | Bileth | 280/79.11 |
| 2007/0075511 | A1 | 4/2007 | Shubert | |

OTHER PUBLICATIONS https://www.autobodytoolmart.com/p-13697-17004.aspx, Auto Body Toolmart website, under Shop Equipment/Tire Equipment—1587—Astro ¾Ton Dual Wheel Dolly—WD1500, 1 page.
https://www.autobodytoolmart.com/p-12893-16044.aspx, Auto Body Toolmart website, under Shop Equipment/Car Dollies—2378—GoJak Wheel Dolly—5000, 1 page.
https://www.autobodytoolmart.com/p-18048-13292.aspx, Auto Body Toolmart website, under Shop Equipment/Tire Equipment—OTC5095A—Easy Lever Wheel Dolly (Light/Medium Duty)—5095A, 1 page.

(Continued)

*Primary Examiner*—Christopher P Ellis
*Assistant Examiner*—John D Walters
(74) *Attorney, Agent, or Firm*—Knobbe, Martens, Olson & Bear, LLP.

(57) ABSTRACT

An automobiles dolly is provided for connecting to a disabled vehicle in order to facilitate moving the vehicle. The dolly includes a base and a plurality of types of vehicle supports that are selectively attachable to the base. Each type of vehicle support is configured to attach to a disabled vehicle at a different support location, or is configured to accommodate a unique construction of a vehicle make or model. As such, a single dolly base can selectively be used with a plurality of different types of vehicle supports.

20 Claims, 15 Drawing Sheets

OTHER PUBLICATIONS https://www.autobodytoolmart.com/p-10849-13293.aspx, Auto Body Toolmart website, under Shop Equipment/Tire Equipment—OTC5096A—Easy Lever Wheel Dolly (Heavy Duty)—5096A, 1 page.

https://www.autobodytoolmart.com/p-14497-18011.aspx, Auto Body Toolmart website, under Shop Equipment/Jacks & Stands—Floor Jacks & Stands—2377—GoJak Heavy-Duty Wheel Dolly—6200, 2 pages.

https://www.autobodytoolmart.com/p-10851-13296.aspx, Auto Body Toolmart website, under Shop Equpment/Tire Equipment—OTC 5105—OTC High-Lift Dual Wheel Dolly—5105, 1 page.

https://www.autobodytoolmart.com/p-13743-17073.aspx, Auto Body Toolmart website, under Shop Equipment/Car Dollies—7175—Champ Car Dolly, 1 page.

https://www.autobodytoolmart.com/p-11518-14186.aspx, Auto Body Toolmart website, under Shop Equipment—Car Dollies—070—Champ Adjustable Rolling Wheel Stands, 1 page.

https://www.autobodytoolmart.com/p-12892-16043.aspx, Auto Body Toolmart website, under Shop Equipment/Car Dollies—2380—GoJak Rack—456, 1 page.

https://www.autobodytoolmart.com/p-10687-13129.aspx, Auto Body Toolmart website, under Shop Equipment/Car Dollies—7302—4" Car Dolly Cast for Asphalt, 1 page.

https://www.autobodytoolmart.com/p-11514-14182.aspx, Auto Body Toolmart website, under Shop Equipment/Car Dollies—4055—Champ Adjustable Wheel Stand Without Casters, 1 page.

https://www.autobodytoolmart.com/p-12100-14906.aspx, Auto Body Toolmart website, under Shop Equipment/Car Dollies—6449—OTC 1,500 lb Easy Roller—1580, 1 page.

https://www.autobodytoolmart.com/p-10701-13143.aspx, Auto Body Toolmart website, under Shop Equipment/Car Dollies—7180—1500 lb Auto Dolly—Set Of Four, 1 page.

https://www.autobodytoolmart.com/p-10850-13294.aspx, Auto Body Toolmart website, under Shop Equipment/Tire Equipment—OTC 5100—OTC Wheel Mate—5100, 1 page.

* cited by examiner

AUTOMOTIVE DOLLY SYSTEM

CROSS-REFERENCE TO RELATED APPLICATIONS

This application claims the benefit of U.S. Provisional Application Ser. No. 60/841,611, which was filed on Aug. 31, 2006, the entirety of which is hereby incorporated by reference.

BACKGROUND OF THE INVENTION

1. Field of the Invention

The present invention relates to a wheeled dolly and more particularly to a dolly system for use with disabled automobiles.

2. Description of the Related Art

A disabled automobile may be damaged and/or partially disassembled. In some cases a wheel may be removed or inoperable. In situations it may be very difficult to move such a vehicle. This dilemma often arises during automotive repair, in which a vehicle is typically partially disassembled.

For many repairs and body work, wheels, axles and the like may be removed or inoperable. Often there is a delay between repair steps so that a vehicle remains partially disassembled for a period of time. However, it may be desired to move this vehicle during this time period. Wheel devices exist to help move such vehicles. However, for some devices, the vehicle sits atop the device held in place only by gravity. Such an arrangement is tenuous as the automobile may become disengaged from the device relatively easily. This leads to safety concern as well as possible damage to the vehicle.

Additionally, some devices are available that include only a single approach to connecting to an automobile such as, for example, by grasping a wheel of the vehicle. However, due to the wide variety of repair work to be done on vehicles, sometimes there are only limited options for connecting to a disabled vehicle.

SUMMARY OF THE INVENTION

Accordingly there is a need in the art for an automotive dolly system that will securely connect to a disabled vehicle so that the vehicle can be moved fairly easily and which is capable of connecting to multiple types of vehicles in multiple ways and at multiple locations.

In accordance with one embodiment, an automotive dolly system is contemplated that includes one or more supports that are configured to engage and attached to different support locations defined on an automobile. The dolly system can be customized to fit not only the model of vehicle but also the vehicle's state of disassembly or damage so that the dolly is versatile and can be used in different configurations to securely engage and hold onto a vehicle so that the vehicle can be safely and easily moved.

In accordance with a preferred embodiment, the present invention provides a system for temporarily supporting a vehicle having a plurality of support locations. The system comprises a dolly, a first support, and a second support. The dolly comprises a base supported by at least one wheel. The first support is selectively attachable to the base and is adapted to engage a first vehicle support location. The second support is selectively attachable to the base and is adapted to engage a second vehicle support location. The dolly can be selectively configured in a first configuration in which the first support is attached to the base and a second configuration in which the second support is attached to the base.

In another embodiment, the dolly is selectively configured such that only the first support is attached to the base.

In a further embodiment, the first support location comprises an automobile pinch weld. In a yet further embodiment, the first support location comprises an automobile wheel lug bolt.

In one embodiment, the first support comprises a pair of support members, each support member having a base, an arm, and an engagement portion. In one such embodiment, each support base is attached to the dolly base so that engagement portions of support members cooperate to engage an vehicle support location. In another such embodiment, the dolly base has an angled portion and each support member base is mounted to an angled portion of the dolly base. In a further embodiment, the pair of support members are arranged generally in an A-frame configuration. In yet another embodiment, engagement portions are elongate and comprise generally flat engagement surfaces so that at least a portion of the vehicle support location is gripped between a pair of engagement surfaces.

In yet a further embodiment, the engagement portions each comprise an aperture for engaging a vehicle wheel lug bolt. In another embodiment, the first support member arm is at least partially rotatable relative to the support member base.

In a still further embodiment, the dolly base is rectangular. In one such embodiment, wheels are positioned at the corners of the rectangular dolly base.

Still a further embodiment comprises a plurality of dollies, a plurality of first supports, and a plurality of second supports. The dollies can be configured so that a plurality of dollies simultaneously are in one of the first and second configurations, and a plurality of dollies can be attached to a single vehicle.

One such embodiment additionally comprises a bridge ramp having a ramp surface configured to accommodate a dolly rolling thereover, the bridge ramp having opposing ends and a crest, the crest being vertically higher than the opposing ends, and the bridge ramp provides a path for a loaded dolly to move over a raised obstacle without engaging the obstacle.

Another such embodiment additionally comprises a ramp having a ramp surface configured to accommodate a dolly rolling thereover, the ramp having opposing ends and being substantially flat between the opposing ends, and the ramp is adapted to rest on a surface so as to provide a more advantageous path for a loaded dolly to move over than the surface upon which the ramp rests. In one such embodiment, the ramp has side edges extending between the opposing ends, and at least one of the side edges is raised relative to the ramp surface.

In accordance with another embodiment, the present invention provides a method for moving a disabled vehicle. The method comprises providing a wheeled dolly comprising a base supported by at least one wheel, and providing a first support and a second support. Each of the supports is configured to be selectively attachable to the dolly base. The first support has an engagement portion adapted to engage a disabled vehicle at a first location on the vehicle. The second support has an engagement portion adapted to engage a disabled vehicle at a second location on the vehicle. The method further comprises selecting one of the first and second supports, mounting the selected one of the first and second supports to the base, attaching the engagement portion of the selected support to the corresponding one of the vehicle support locations so that the vehicle is at least partially supported by the wheeled dolly, and moving the vehicle so that the dolly wheel rolls.

One embodiment additionally comprises providing a ramp, placing the ramp on or above an obstacle, and moving the vehicle so that the dolly rolls on the ramp and over the obstacle.

Another embodiment additionally comprises providing a plurality of wheeled dollies, a plurality of first supports, and a plurality of second supports, selectively mounting selected ones of the first and second supports to one or more dollies, and attaching the engagement portions of the selected supports to corresponding vehicle support locations so that the vehicle is supported by a plurality of wheeled dollies.

DETAILED DESCRIPTION OF PREFERRED EMBODIMENTS

Figure 1:
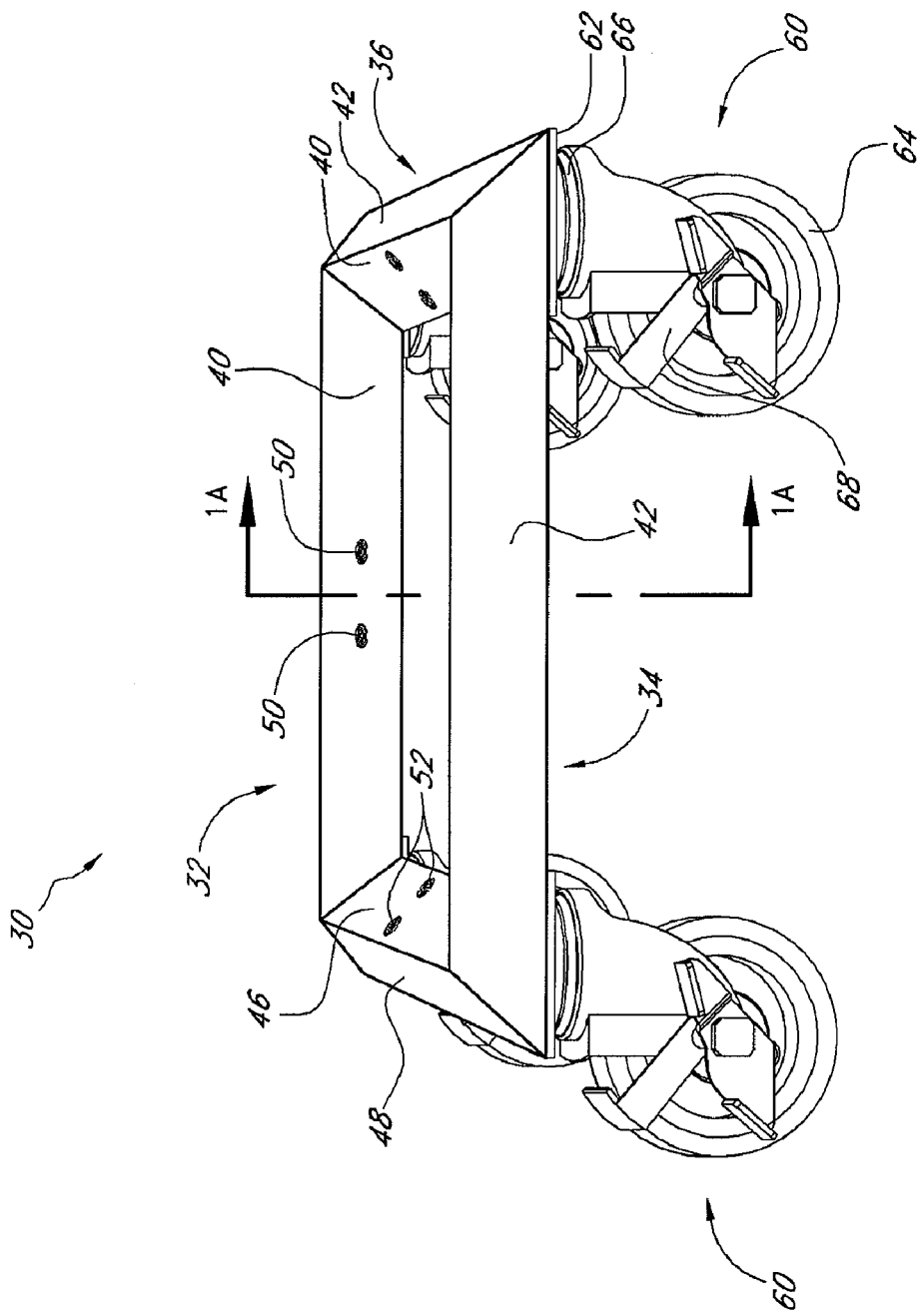
FIG. 1 is a perspective view of a wheel dolly base in accordance with an embodiment.
Figure 2:
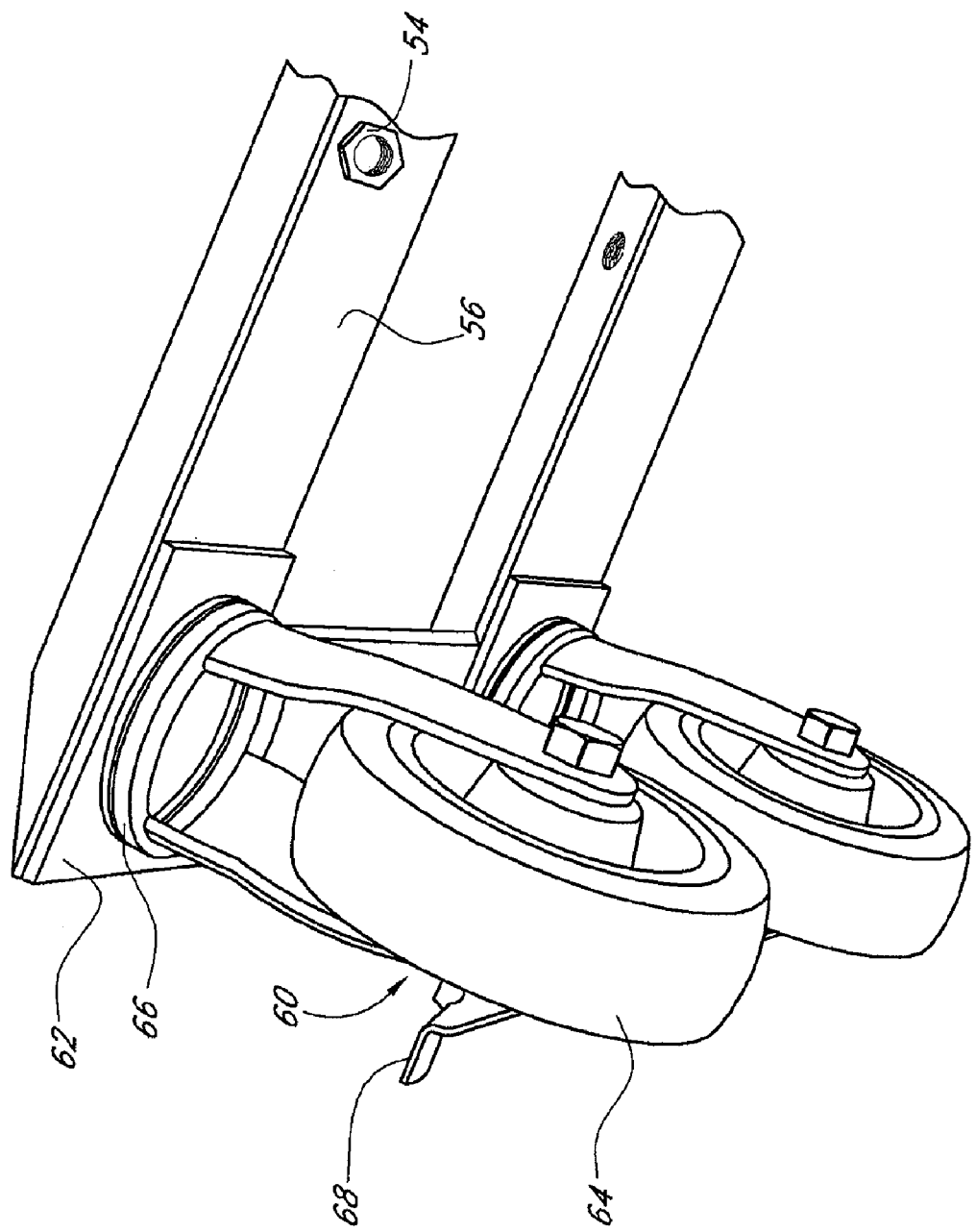
FIG. 2 is a partial bottom perspective view of the wheeled dolly base of FIG. 1.

With initial reference to FIGS. 1-2, an embodiment of an automotive dolly 30 comprises a wheeled dolly base 32. The illustrated base 32 comprises a pair of spaced-apart elongate first frame members 34 and a pair of spaced-apart elongate second frame members 36. Ends of the first frame members 34 are connected to ends of the second frame members 36 to form a generally hollow rectangular shape. Preferably the first frame members 34 are longer than the second frame members 36.

Figure 1A:
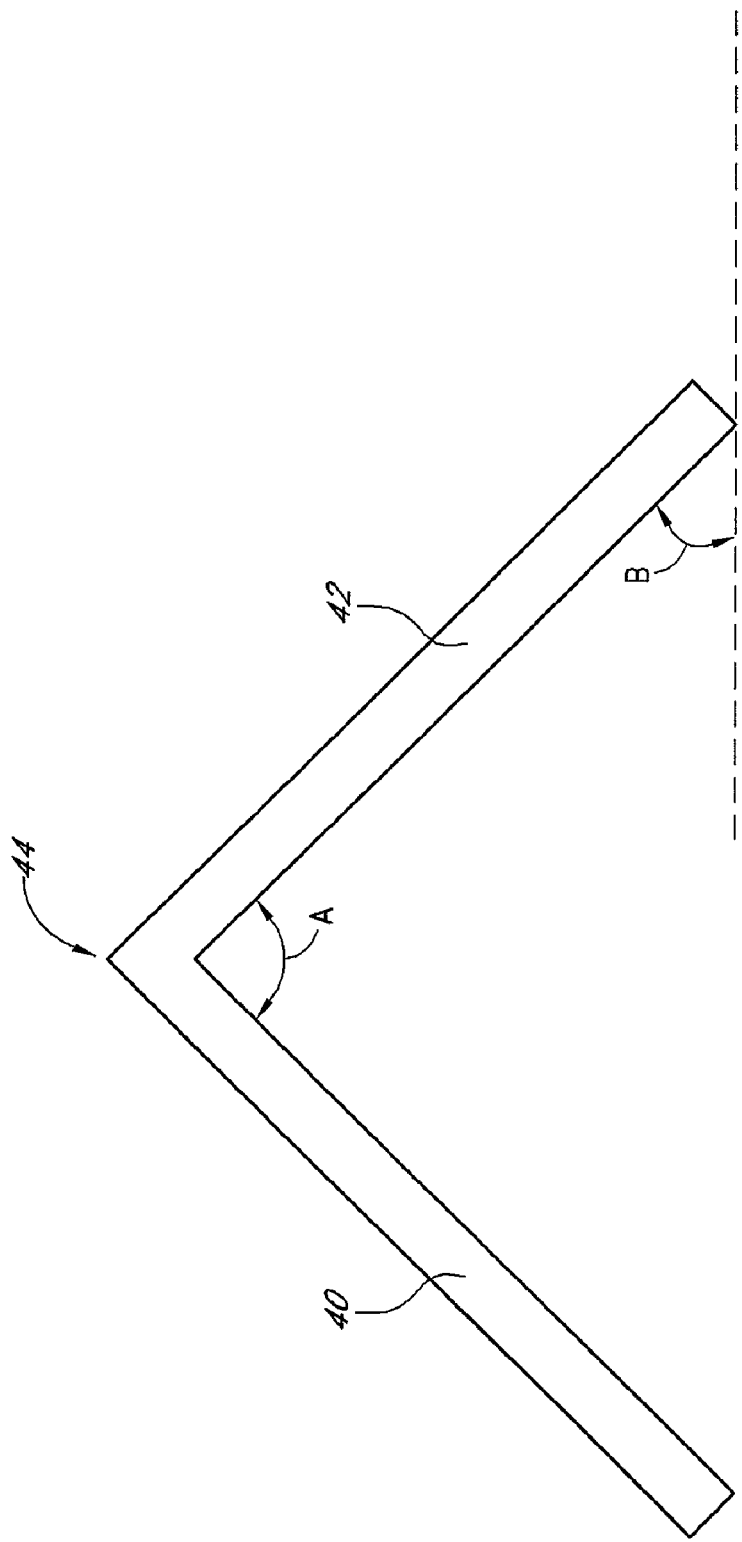
FIG. 1A is a cross-sectional view of a portion of the wheel dolly base of FIG. 1 taken along the lines 1A-1A.

As best shown in FIG. 1A, the frame members of the illustrated embodiment preferably are constructed of elongate bars of metal commonly referred to as "angle iron." More specifically, the frame members 34, 36 comprise extruded elongate members comprising inner and outer portions 40, 42 that are joined at a bend or joint 44. Preferably the inner and outer portions 40, 42 are disposed at an angle A of about 90° relative to one another at the joint 44. In the illustrated embodiment, the frame members 34, 36 preferably are arranged so that the joint 44 is at an uppermost position along the frame members. As such, surfaces of the frame member inner and outer portions 42 are disposed at an angle B of about 45° relative to horizontal. As shown, each inner portion 40 of the frame members 34, 36 has an inner surface 46 facing generally toward the inner surfaces of the other frame members, and each outer portion 42 of the frame members 34, 36 has an outer surface 48 facing generally away from the other outer surfaces of the frame members.

Mounting apertures 50, 52 preferably are formed in each of the frame members 34, 36. In the illustrated embodiment, a pair of first mounting apertures 50 are formed through the inner portions 40 of both first frame members 34. Preferably the first apertures 50 are generally horizontally spaced from one another and are disposed generally centrally along the length of the respective frame member 34. More specifically, each frame member 34 has a halfway point along its length, and most preferably the apertures 50 are equally spaced from the halfway point. Preferably, the first mounting apertures 50 on the opposing first frame members 34 are aligned with one another.

As best shown in FIG. 2, in the illustrated embodiment, a bolt 54 or other threaded member is welded to a bottom surface 56 of the inner portion 40 and generally aligned with each aperture 50, 52 so as to provide a threaded connection corresponding to the aperture. Of course, it is to be understood that the apertures themselves may be threaded in some embodiments.

A pair of second mounting apertures 52 are formed through the inner portions 40 of each of the second frame members 36. Preferably, the second apertures 52 are vertically spaced from one another and are disposed generally at a halfway point along the length of their respective frame member 36. Preferably, the second apertures 52 are at least partially threaded, and the second apertures 52 of the opposing second frame members 36 are generally aligned with one another.

As illustrated in FIGS. 1 and 2, heavy duty casters 60 preferably are attached at each corner of the rectangular dolly base 32. In the illustrated embodiment, each caster 60 comprises a mount plate 62 from which a wheel member 64 depends. The wheel members 64 swivel about bearing surfaces 66 at which they interact with the mount plate 62. Preferably, one or more of the casters 60 includes a foot operated brake 68 for preventing unwanted rolling of the wheels 64. In a preferred embodiment, the mount plate 62 of each caster 60 is welded to the associated frame members 34, 36. It is to be understood, however, that other methods and structures can be employed for attaching the casters to the frame members 34, 36.

In the illustrated embodiment, the ends of the first and second frame members 34, 36 are welded together at a generally 45° angle. It is to be understood, however, that other structures and methods can be used for connecting/joining the first and second frame members 34, 36 to one another. Additionally, other structures and methods can be used for forming the base 32. For example, in another embodiment, ends of the frame members can generally overlap one another and can be bolted together. In yet another embodiment, the base is formed by directly molding or stamping material into a rectangular or other configuration. In still further embodiments, the frame members are formed of metal or plastic tubes having a rectangular, triangular, circular, or other cross-sectional shape. Additionally, in yet further embodiments, the frame members may have differently-configured upper surfaces such as a flat or rounded surface, and other embodiments contemplate frame surfaces having other angles such as any desired angle less than or greater than 90°.

Further, other embodiments may employ different materials and configurations for the wheeled base. For example, the base may employ tubing formed into a generally circular shape and having one, two, three or more casters. In still another embodiment, the base comprises a molded high strength polymer. Other shapes and materials are also contemplated.

Figure 3:
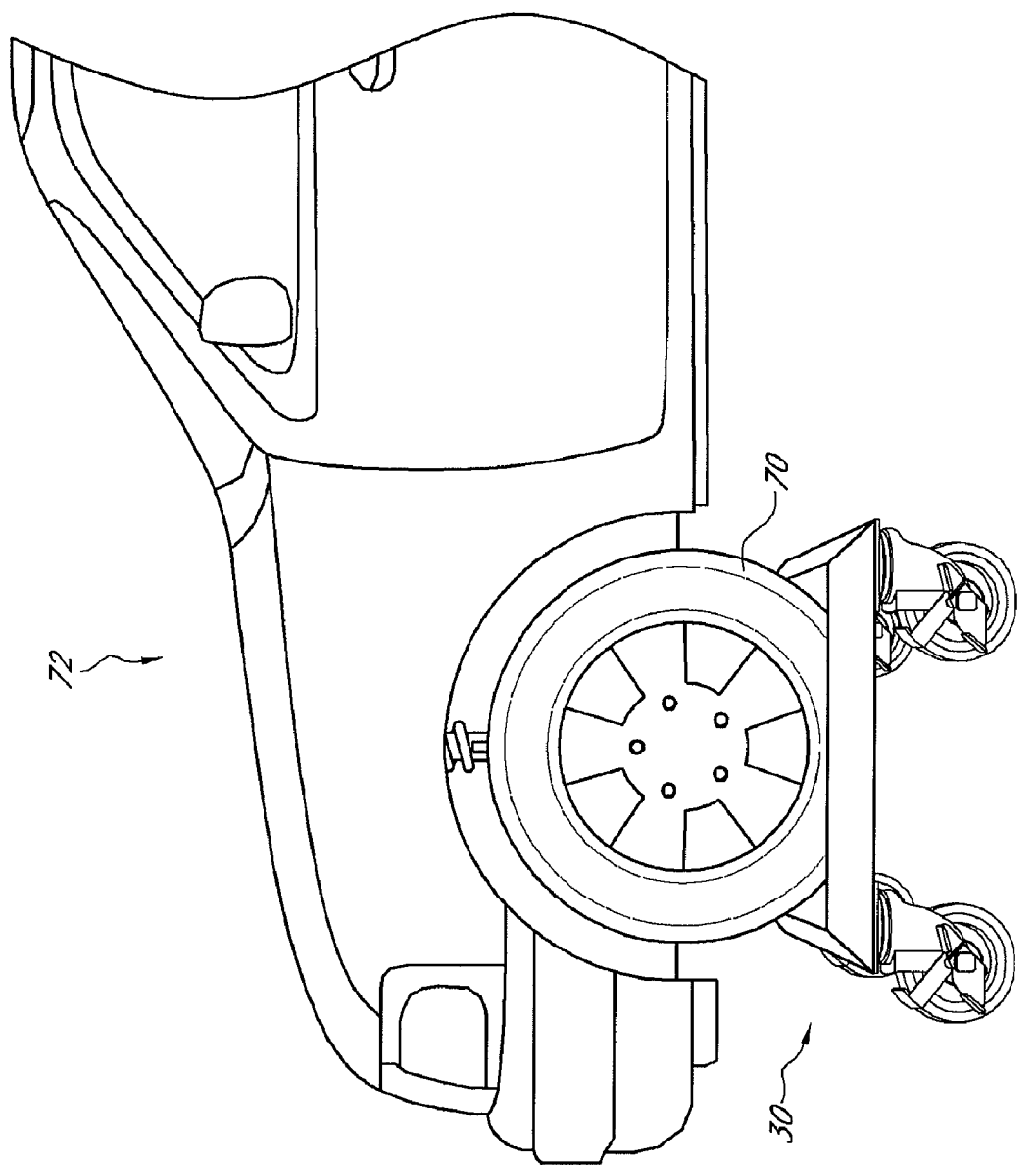
FIG. 3 is a side view showing an automobile being held by the wheel dolly base of FIG. 1.

With reference next to FIG. 3, the base 32 of FIGS. 1 and 2 is shown being used in accordance with one embodiment. In the present embodiment, an automobile tire 70 is shown resting on the dolly 30 with the tire 70 engaging the inner surfaces 46 of the dolly. As such, the dolly 30 holds the automotive tire 70 therein, and the vehicle 72 can be moved in any direction without having to use or roll the vehicle's wheel.

Figure 4:
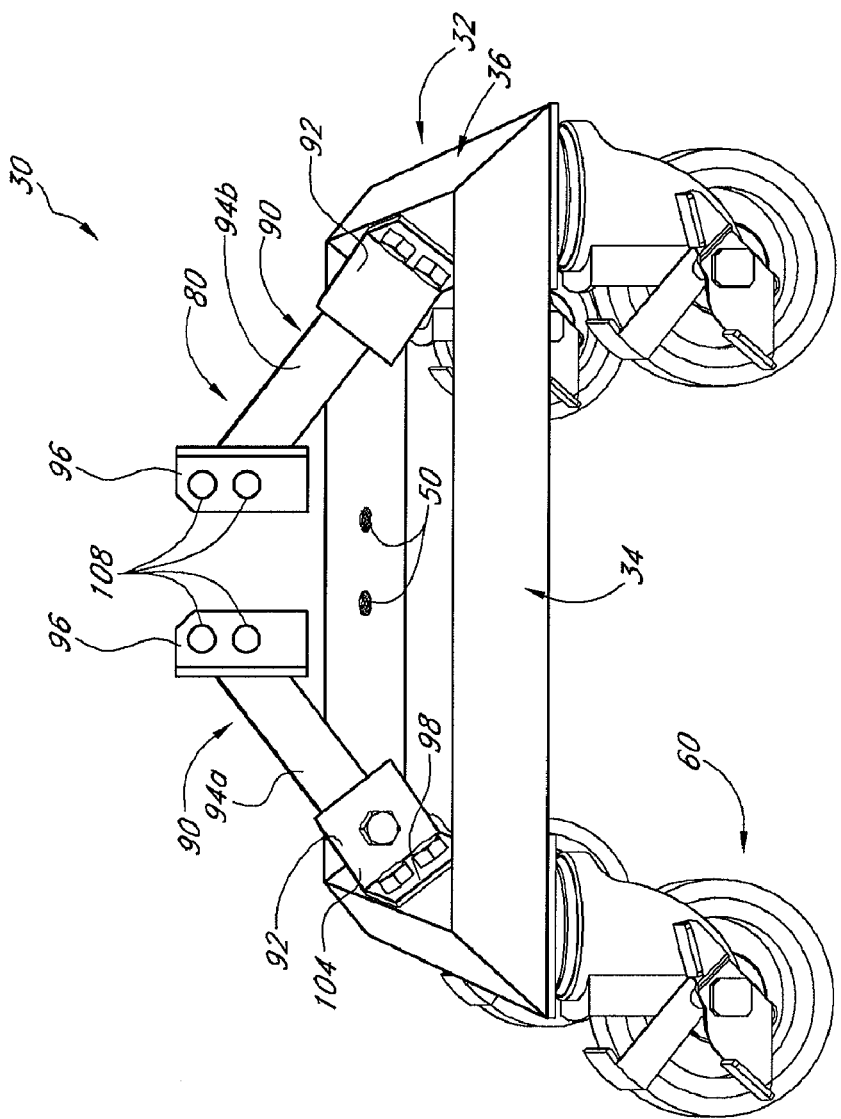
FIG. 4 is a perspective view of an embodiment of a wheeled dolly in one configuration.
Figure 5:
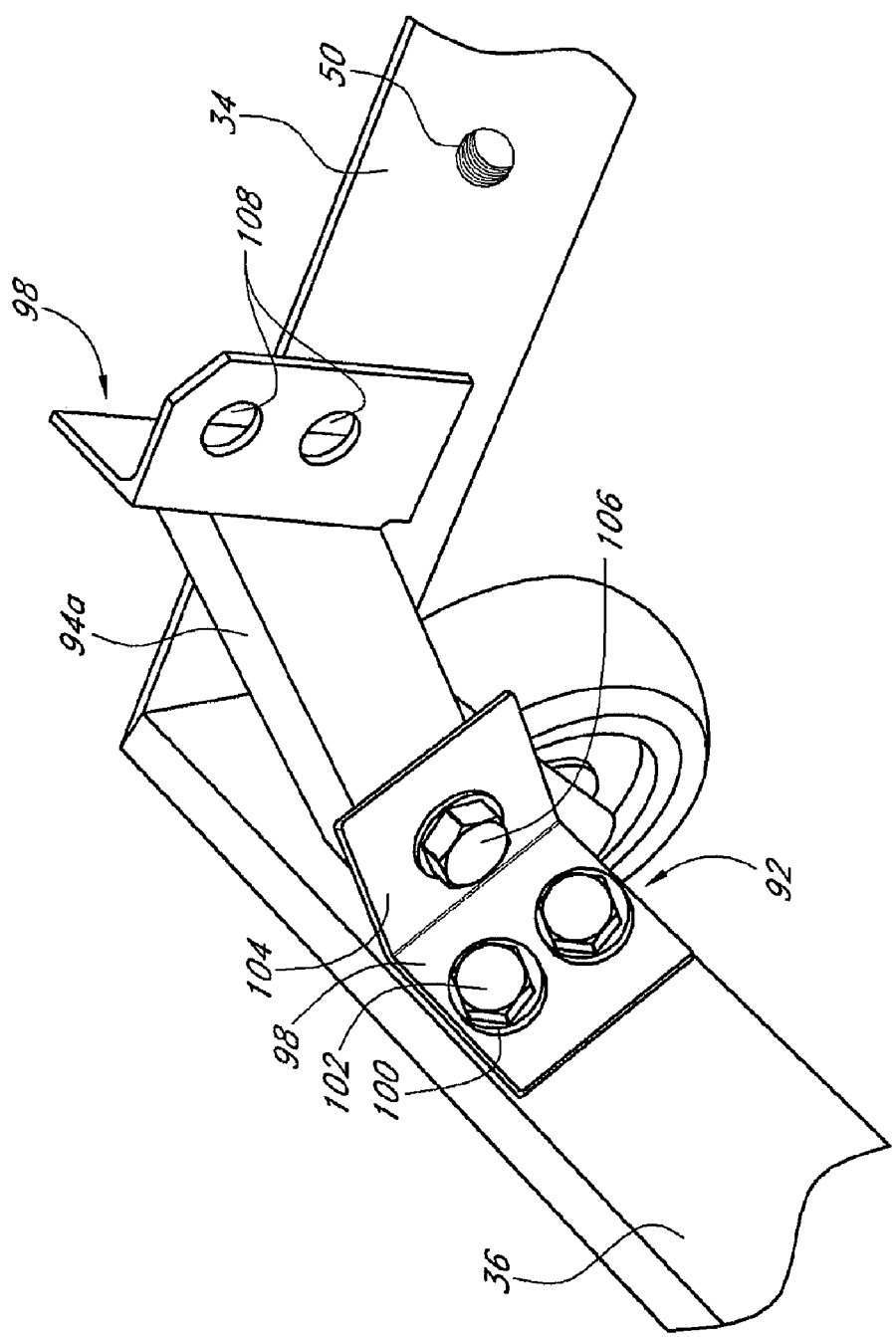
FIG. 5 is a partial perspective view of the wheel dolly of FIG. 4 from a different angle.
Figure 6:
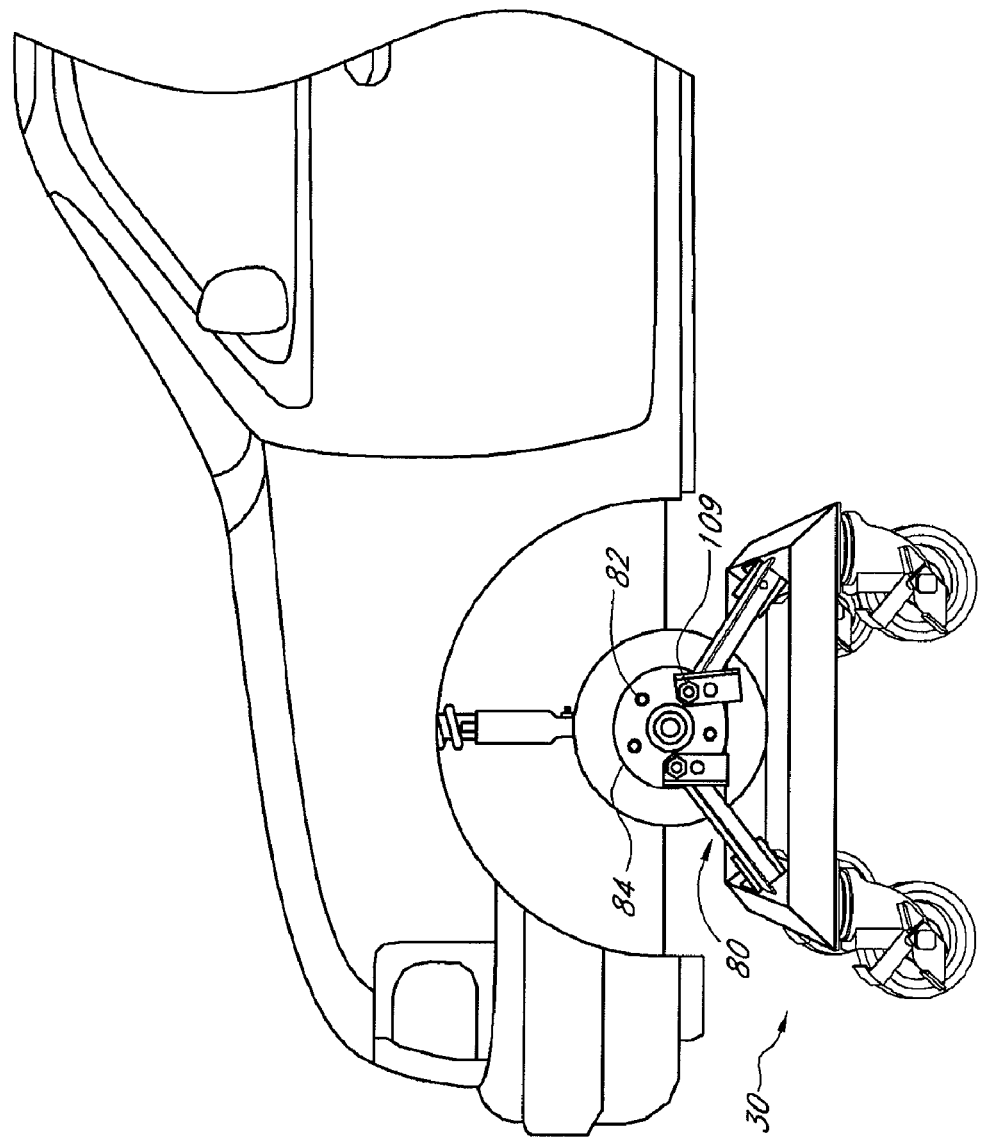
FIG. 6 shows the embodiment of FIG. 4 attached to and supporting an automobile.

With reference next to FIGS. 4-6, another embodiment is illustrated in which a dolly 30 is configured to engage and support a vehicle in a different location than shown in FIG. 3. In the illustrated embodiment, the wheeled dolly base 32 of FIG. 1 is configured with a wheel hub support system 80 that engages lug nuts 82 on the vehicle's wheel hub 84 so as to support the vehicle 72. The illustrated wheel hub support 80 comprises opposing hub support members 90 that are adapted to be mounted on the wheeled dolly base 32. Each of the hub support members 90 comprises a support base 92 coupled to an elongate arm 94 and an engagement member 96.

The illustrated hub support bases 92 each comprises angle iron. A first portion 98 of the support base 92 has two vertically spaced apertures 100 configured so that the apertures 100 of the support base 92 align with the vertically spaced second mounting aperture 52 of the corresponding second frame members 36 of the dolly base 32. The illustrated hub support member base 92 is attached to the dolly's base frame members 36 via bolts 102 through the aligned apertures 100 so that the first portion 98 of the support base 92 engages and sits firmly on the inner surface 46 of the dolly base frame member 36. A second portion 104 of the hub support base 92 is preferably attached an elongate arm 92.

In the illustrated embodiment, the hub support member arm 94 comprises generally elongate angle iron. A first one of the support arm 94A preferably attaches to the second portion 104 of the support member base 92 via a bolt 106 or other pivoting contact. A second one of the support member arms 94B preferably is welded or otherwise fixedly connected to the second portion 104 of its corresponding support member base 92. The first support member arm 94A preferably has some limited rotational movement about the bolt 106 or other pivoting contact. Preferably, such rotation is limited to less than about 20°. In the illustrated embodiment, the end of the first arm 94A adjacent the support base 92 engages the first portion 98 of the support base 92 to prevent further rotation in either direction. Of course, other embodiments may include different structures to limit rotation. Still other embodiments may allow a much greater range of rotation.

Each of the hub support member arms 94 preferably is attached to a hub support engagement member 96. In the illustrated embodiment, each engagement member 96 is welded to a corresponding support arm 94. The illustrated hub support engagement members 96 comprise angle iron having two vertically spaced apertures 108, each adapted to accommodate an automobile lug bolt 82. In practice, and as shown in FIG. 6, the automotive lug bolt 82 preferably is positioned so as to fit through the aperture 108 and a nut 109 holds it securely in place in the engagement member 96. As such, the dolly 30 configured with the hub support 80 securely supports the vehicle 72.

Since the first support arm 94A is partially pivotable about the support base 92, flexibility is provided for making minor position adjustments to help align an aperture 108 of the engagement member 96 with a corresponding lug bolt 82. Further, having multiple (two, three or more) apertures 108 provided in the engagement member 96 provides still further flexibility in fitting the hub support member to an automobile's lug bolts. Nevertheless, having only a single aperture would still be an operative and advantageous embodiment.

In the illustrated embodiment, the hub support members 90 extend generally at a 90° angle from corresponding inner surfaces 46 of the frame members 36 to which they are attached. As such, the pair of hub support member arms 92 preferably form a generally A-frame configuration, and each is disposed generally at about a 45° angle from horizontal.

It is to be understood that other structures and methods can be used to form a wheel hub support. For example, although the illustrated embodiment employs a pair of cooperating support members 90, another embodiment may comprise a unitary member that extends entirely across the dolly base 32 and attaches to two or more of the dolly frame's surfaces. Further embodiments may employ multiple support arms of various configurations and materials. In the illustrated embodiment, the support members 92 are releasedly affixed to the dolly base 32 by bolts 102 extending through mounting holes 52. In other embodiments, clips, cotter pins, male/female connections, other complementary structures, or the like can be used to support or engage the support members relative to the base. Additionally, in some embodiments, wheel hub support members may be formed of any of a variety of materials such as, for example, a molded high strength polymer.

In still further embodiments, the engagement member may be releasable and/or customized for the number of lug bolts on a particular vehicle. For example, one embodiment of an engagement member may have four apertures in a circular pattern and spaced to correspond to a four lug bolt pattern on a vehicle hub. In another embodiment, a five-lug-bolt-aperture engagement member can be employed. In some such embodiments, the four and five aperture (or other patterns) engagement members can be releasably attached to corresponding support arms, thus providing even further flexibility.

In the illustrated embodiment, one of the support arms 94B is welded to the support arm base 92, and the other support arm 94A is rotatable over a slight range in order to aid the connection to the lug bolts 82. In other embodiments, both support arms can be rotatably connected to their respective support bases. In still further embodiments, the support arms can both be rigidly connected to the support base, but one or more of the engagement members can be adjustably connected to the support arms.

Wheel hub support embodiments as described above have been directed towards connecting to lug bolts 82 of the vehicle hub 84. In other embodiments, a wheel hub support can instead be configured to cradle and/or otherwise engage the wheel hub itself rather than the lug bolts. In such an embodiment the engagement member will be configured somewhat differently than in the illustrated embodiment, but still along the principle of engaging and supporting the wheel hub area of the vehicle when the tire and wheel are removed.

Figure 7:
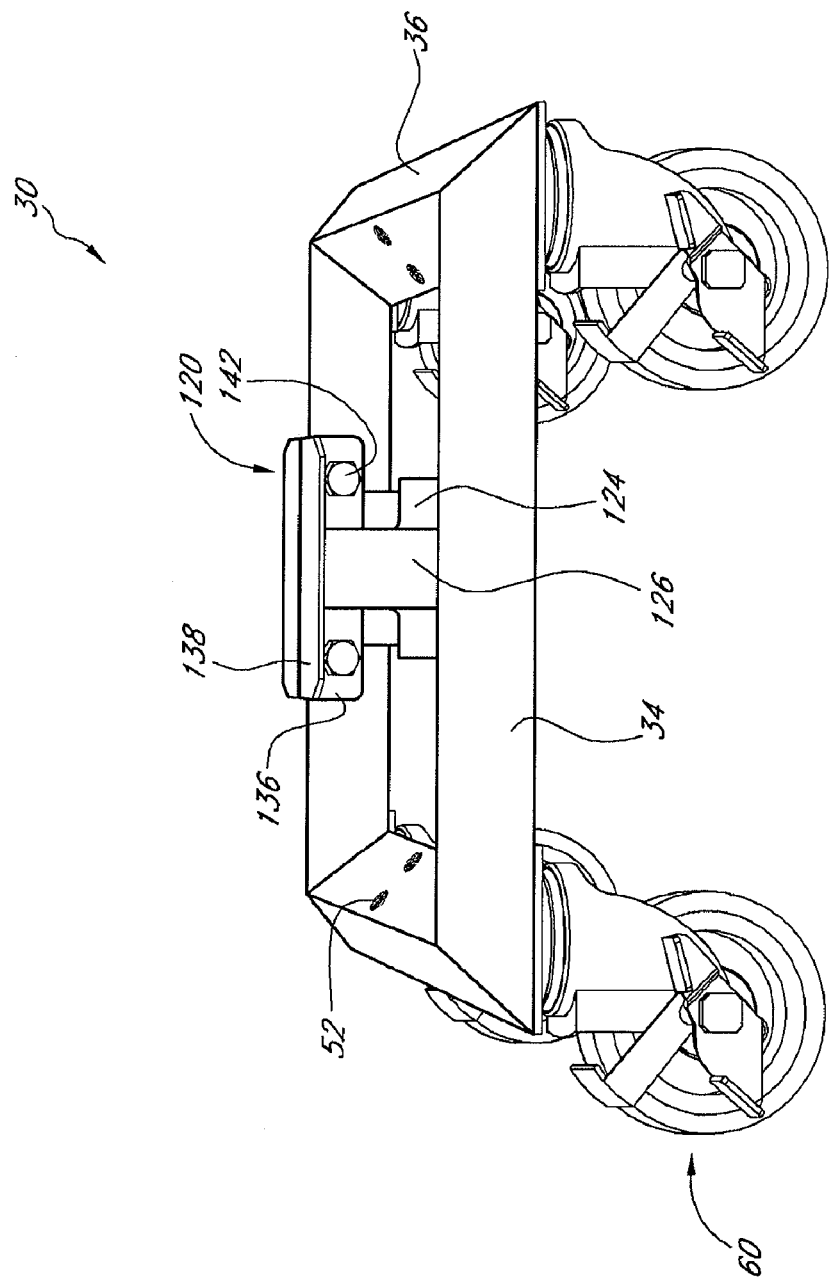
FIG. 7 is a perspective view of an embodiment of a wheeled dolly arranged in another configuration.
Figure 8:
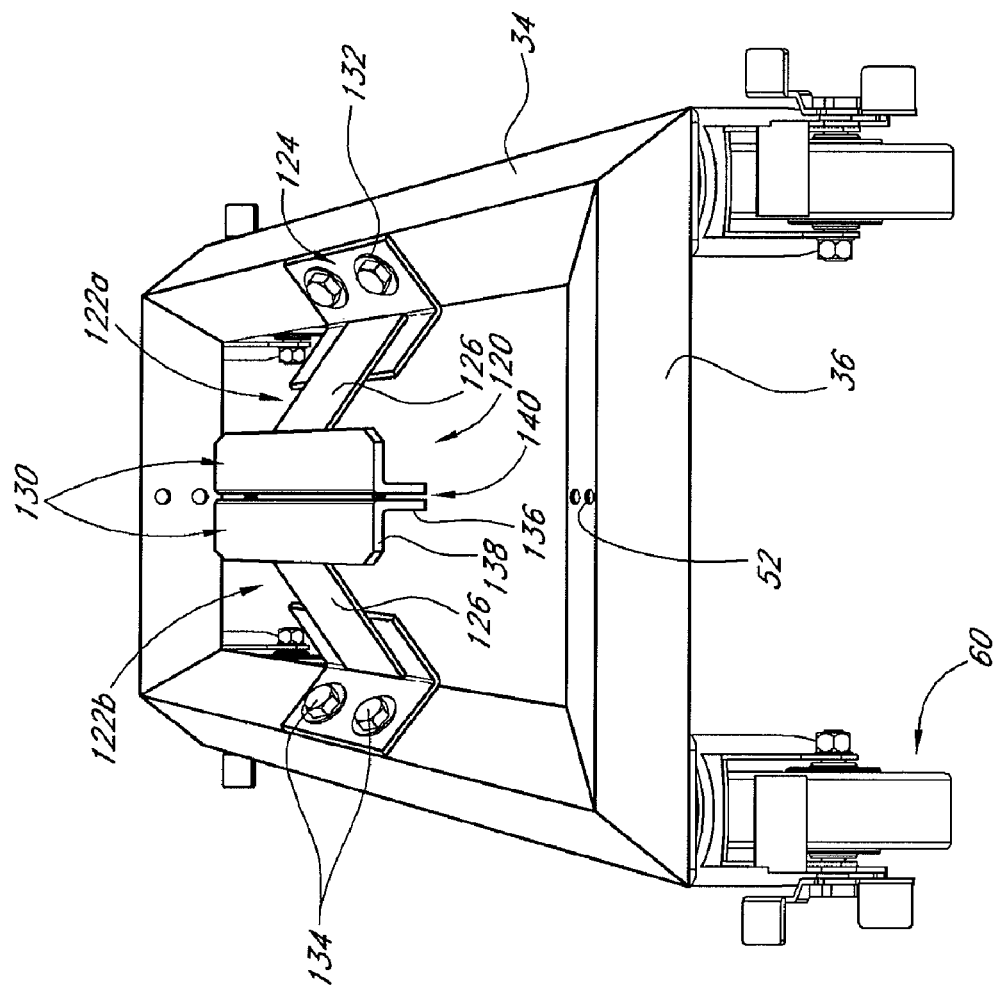
FIG. 8 is an end view of the wheeled dolly embodiment of FIG. 7.
Figure 9:
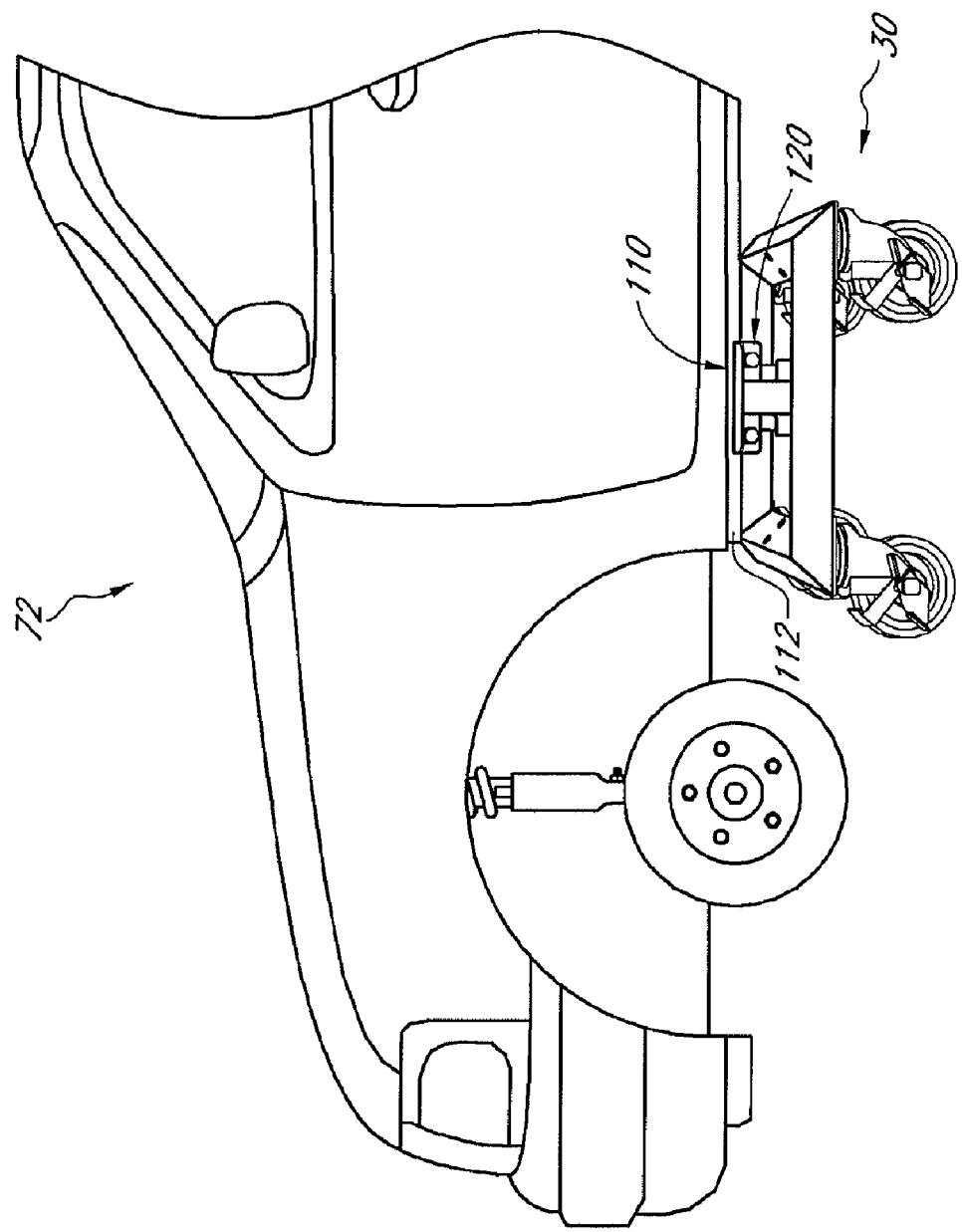
FIG. 9 is a side view showing the automotive dolly of FIG. 7 attached to and supporting an automobile.

With reference next to FIGS. 7 to 9, another embodiment is illustrated in which a wheel dolly 30 is configured to support an automobile 72 by directly engaging the automobile's body. In the illustrated embodiment, the body support location 110 is a pinch weld 112 just behind the automobile's front wheel well. In order to support the car body in accordance with this embodiment, a body support 120 is connected to the dolly base 32. The illustrated body support 120 comprises two separately-formed members 122 that cooperate to engage opposite sides of a vehicle's pinch weld 112 to securely attach the dolly 30 to the vehicle body. In many vehicles a pinch weld 112 is disposed along the bottom of the body, and is shaped generally vertically where two adjacent body structural members are welded together. Typically a pinch weld extends substantially vertical for a short height and then the connected body structural members typically are generally horizontal adjacent the pinch weld.

With continued reference to FIGS. 7 and 9, the body support 120 preferably comprises first and second body support members 122A, 122B, each of which comprises a support base 124, an elongate arm 126, and an engagement member 130. In the illustrated embodiment, the support bases 124 are formed of angle iron having two spaced apart apertures 132 configured to align with the horizontally-spaced first mounting apertures 50 on the corresponding dolly base first frame member 34 inner surface 46. Preferably the support member bases 124 attach to the respective frame members via bolts 134. The support arms 126 preferably are welded or otherwise rigidly attached to the support bases 124 so that the support arms 126 extend generally upwardly and towards the middle of the wheel dolly base 32. In the illustrated embodiment, the support arms 126 are arranged at an angle of about 45° relative to horizontal. Engagement members 130 are preferably welded or otherwise rigidly attached to the support arms 126.

As best shown in FIG. 8, the illustrated engagement members 130 comprise angle iron having a first portion 136 generally vertically arranged and a second portion 138 generally horizontally arranged. When the first and second body support members 122 are mounted in place, the corresponding engagement members 130 are adjacent one another so that a small space 140 is disposed between adjacent engagement first portions 136. As such, the dolly 30 can be positioned so that the vertical portion of the automobile pinch weld 112 fits within the space 140 between the engagement members 130. Preferably bolts 142 extend between the first portions 136 of the engagement members 130 so that the engagement members 130 can be tightened about the pinch weld 112 so as to sandwich the pinch weld 112 between them and securely attaching to the automobile 72. In one embodiment, the bolts 142 are positioned far enough from the second portions 138 of the engagement member 130 so that the entire height of the pinch weld 112 fits within the space 140, and the car body generally rests upon the generally horizontal second portions 138. In another embodiment, a bottom edge of the pinch weld 112 rests at least partially upon the bolts 142 within the space 140.

As shown in the figures, preferably the pair of body support members 122 forms generally and A-frame configuration over the wheel dolly base 32. However, as with the hub support discussed above, it is to be understood that other structures and methods can be used for forming the body support member.

The embodiment just described is configured for a typical pinch weld having a generally vertical construction. However, different makes and models of vehicles may have varying construction, such as differently-shaped structural welds. Accordingly, in other embodiments, body support members customized for particular automotive makes and models may have somewhat different configurations than in the illustrated embodiment in order to more effectively engage the appropriate body structural member of that particular make and/or model. Preferably, however the customized support is releasably securable to the wheeled dolly base 32 as in the illustrated embodiment.

The illustrated hub and body supports illustrate preferred embodiments, but it is contemplated that other structural configurations can appropriately be used. For example, in some embodiments, the support member base, support arm and engagement portions are all bolted together rather than welded together. In other embodiments, the support members are formed by casting. In further embodiments, the supports are each unitarily formed instead of having a pair of opposing members that work together. Preferably, however, the structures are selectively mountable to the wheel dolly base 32 and adapted to engage a particular structural portion or location of an automobile body.

Additionally, the above embodiments are generally tailored to example support locations of an automobile, namely, the hub area 84 and the pinch weld 112 behind the front wheel well. It is to be understood that further supports can be constructed to engage other automotive locations such as a bumper, tow hitch, axle, differential, and other body area. In such other embodiments, supports are specifically shaped to securely engage and attach to the corresponding portion of the automobile so as to be securely attached to the automobile, enhancing safety and decreasing risk that the automobile is going to slide or otherwise move off of the dolly as the vehicle is moved around. Preferably, however, each of these support accessories can be used with the same type of wheel dolly base. Thus, a system is created in which a single set of generally-similar bases can be used in conjunction with a plurality of selectively attachable supports so as to be usable to support several makes and models of vehicles at multiple support locations.

Figure 10A:
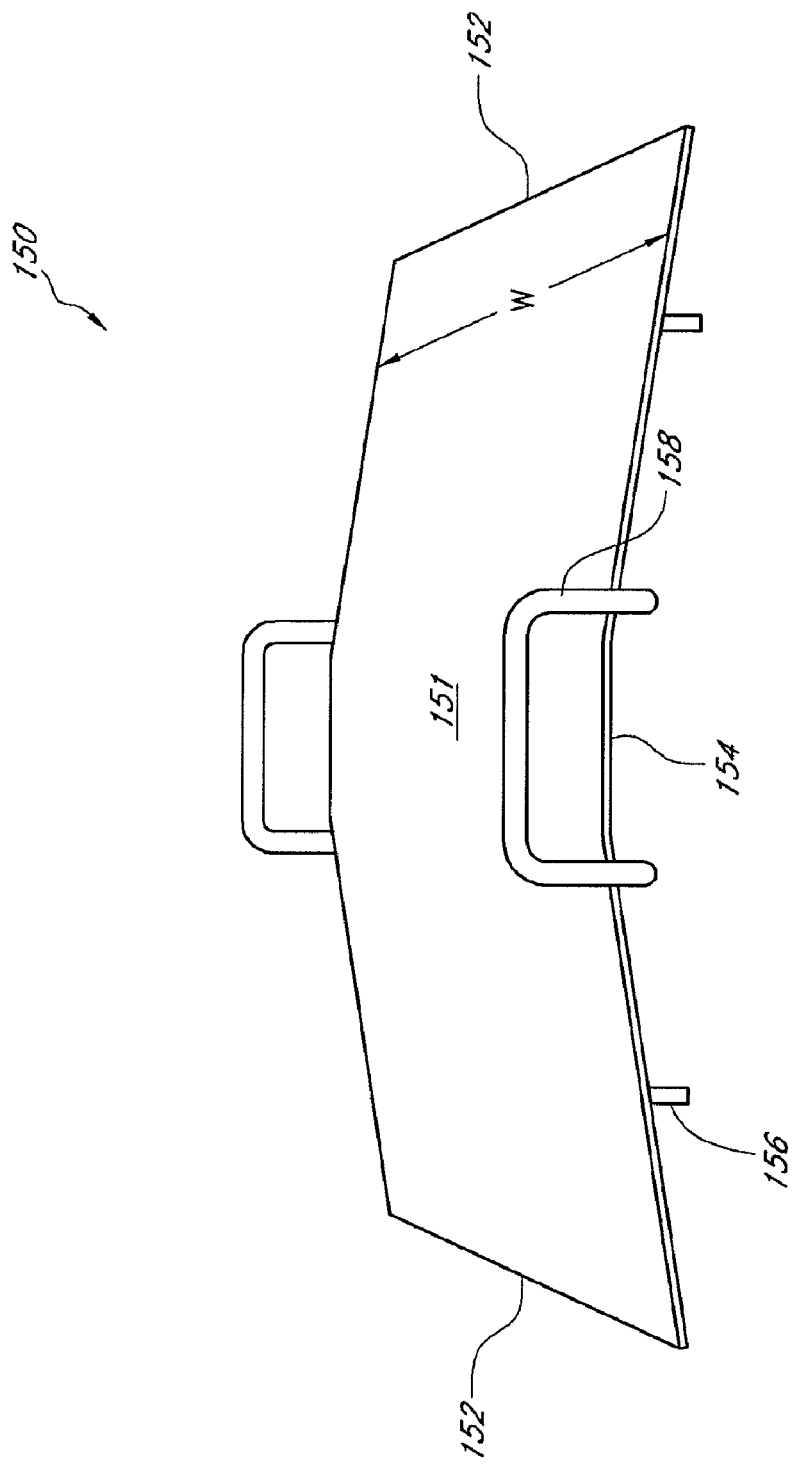
FIG. 10A is a perspective view of a ramp for use in connection with embodiments of an automotive dolly.

With reference next to FIG. 10A, a bridge ramp 150 for use in connection with a wheel dolly 30 is illustrated. In this embodiment, the bridge ramp 150 comprises a ramp surface 151 having opposing ends 152 and a raised crest 154 between the ends 152. Preferably, the bridge ramp 150 also has a pair of supports 156 and a pair of handles 158. In one embodiment, the ramp surface 151 has a width W that is at least as great as the length of the second frame members 36 of the wheeled dolly base 32. More preferably, the width W of the ramp surface 151 is at least as great as the length of the first frame members 34 of the wheeled dolly base 32. As such, the dolly 30 can be rolled across the ramp surface 151 from end to end.

Figure 11:
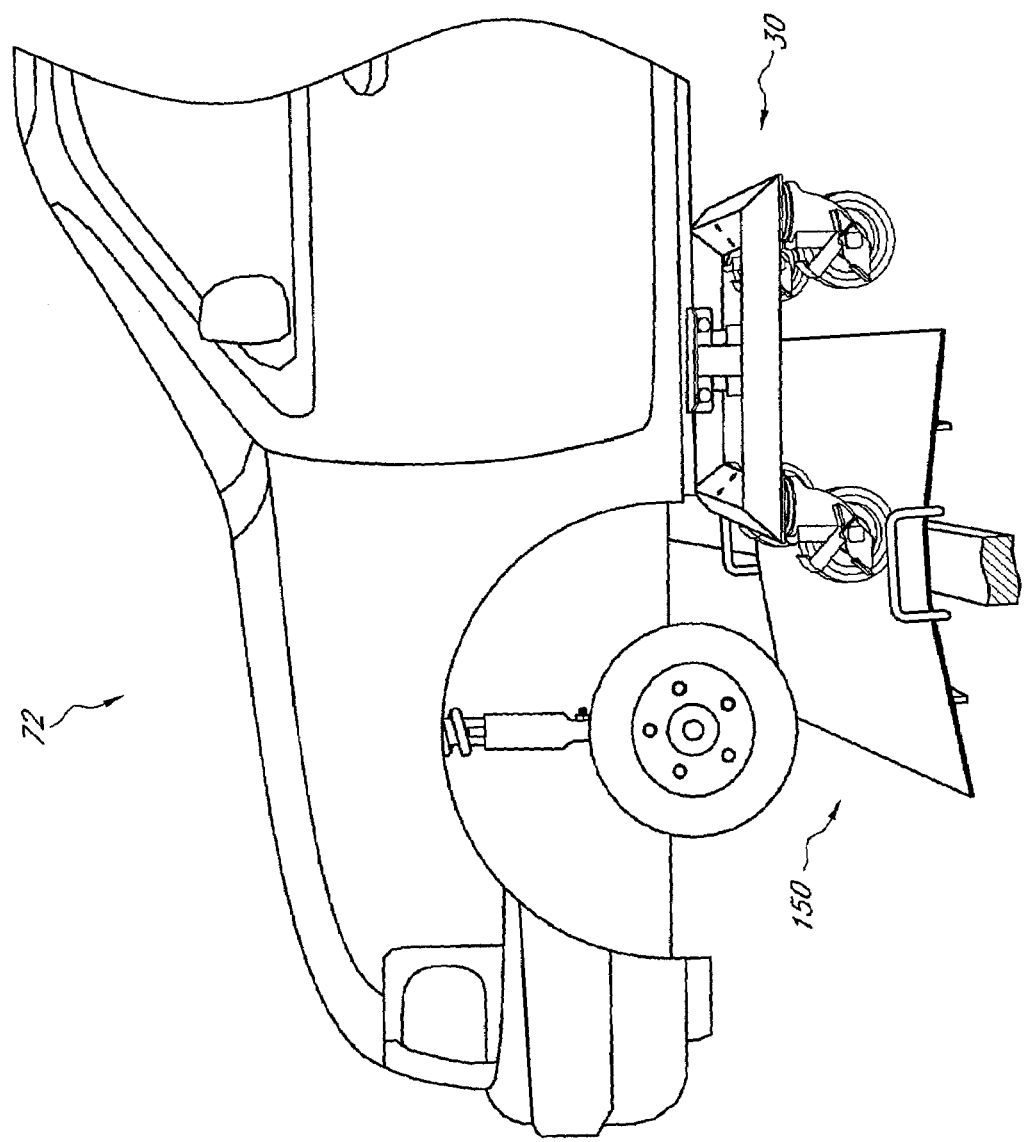
FIG. 11 shows an example of the ramp of FIG. 10A being used with an automotive dolly.

With referenced next to FIG. 11, an embodiment of the ramp 150 is shown in use in conjunction with a wheeled dolly 30 that is supporting a vehicle 72. Because of the raised nature of the ramp surface 151, the ramp allows a vehicle 72 to easily be moved over obstructions such as debris, surface inconsistencies, pipes, or the like.

Figure 10B:
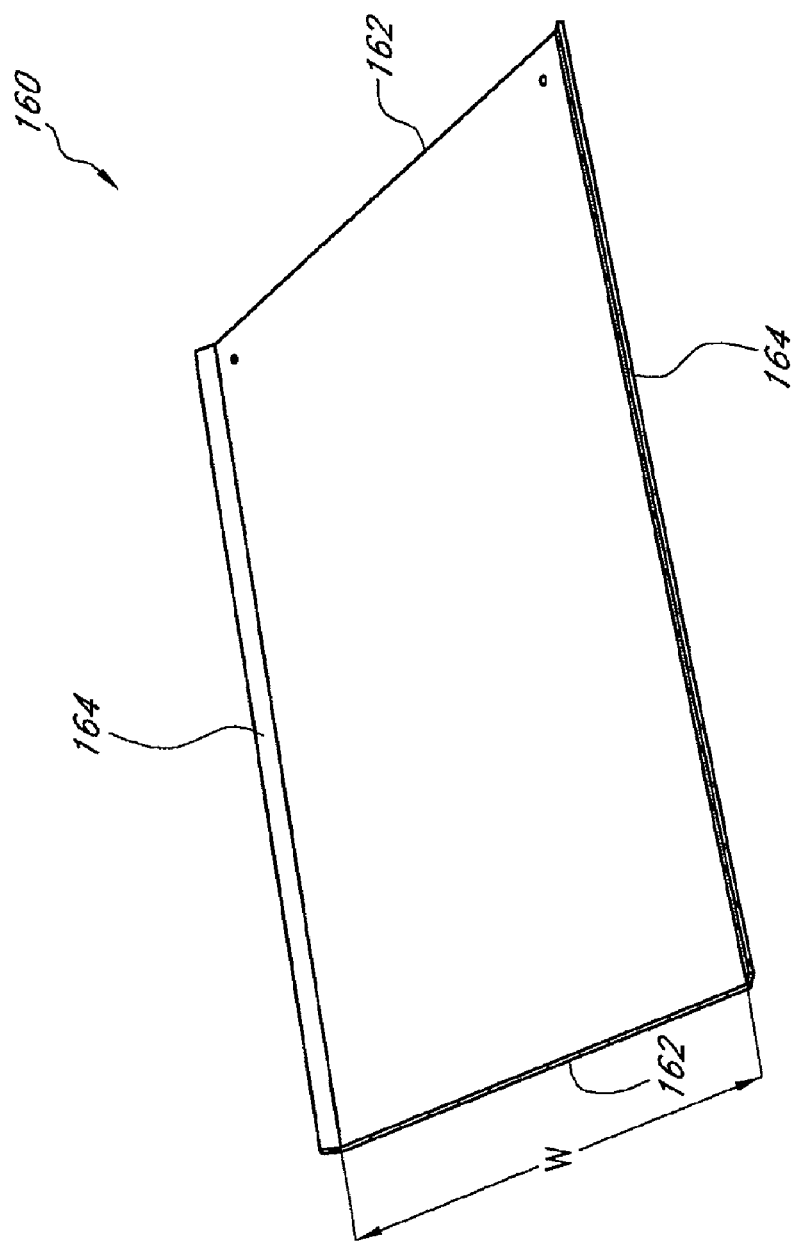
FIG. 10B is a perspective view of another ramp for use with an automotive dolly.

With reference next to FIG. 10B, an embodiment of a straight ramp 160 is provided. Preferably the straight ramp 160 is substantially flat between opposing ends 162. As with the bridge ramp 150 of FIG. 10A, the straight ramp 160 has a width W preferably greater than certain corresponding dimensions of the wheeled dolly base 32. Preferably, side edges 164 of the ramp 160 are raised in order to aid picking up the ramp 160 from a flat surface. The raised portions 164 enable a user's hand to obtain purchase on the ramp to lift it up.

Figure 12:
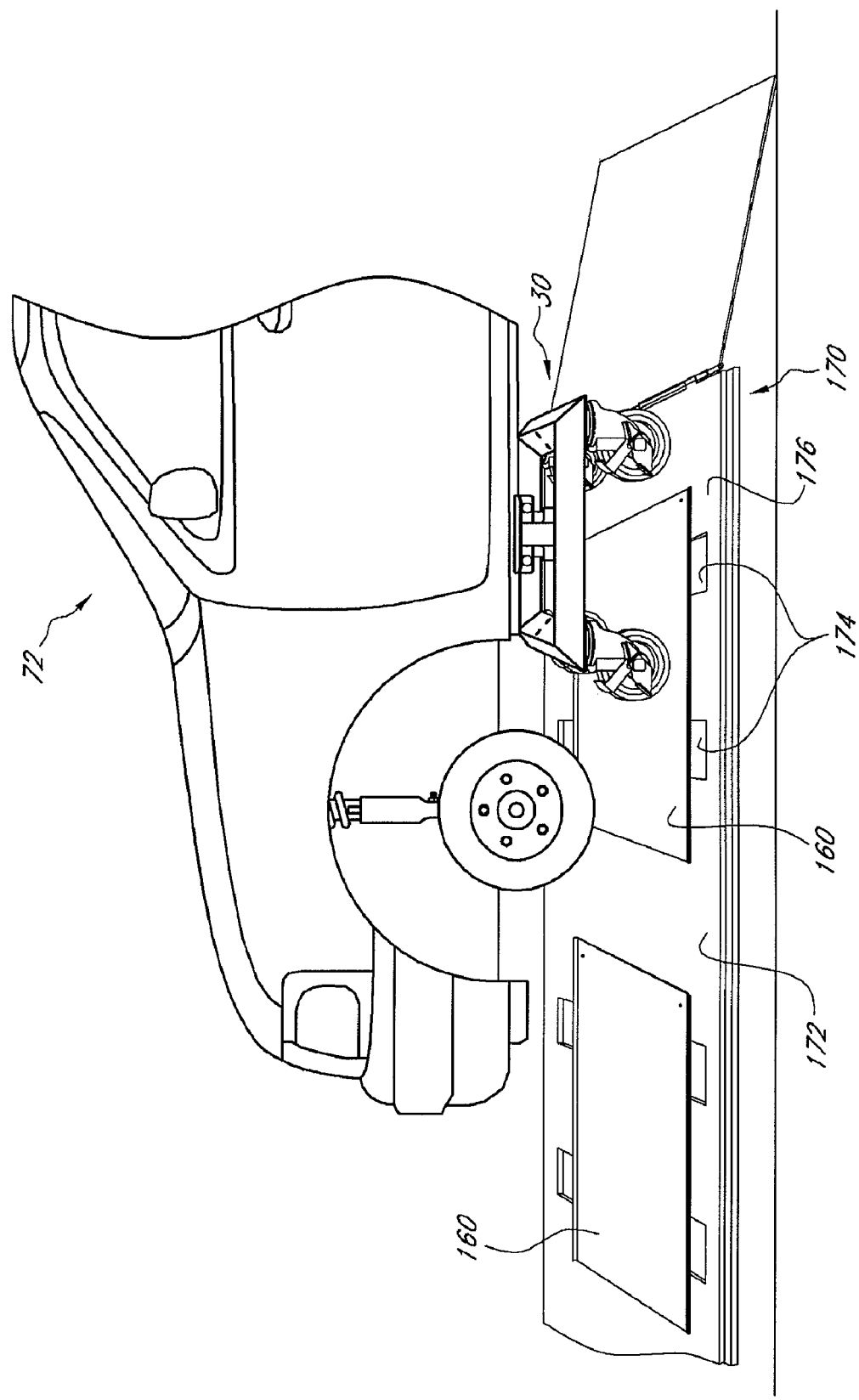
FIG. 12 shows an example of a pair of the ramps of FIG. 10B being used with an automotive dolly.

FIG. 12 illustrates straight ramps 160 being used with a wheeled dolly 30 that is supporting a vehicle 72. In this embodiment, the vehicle 72 being supported by the wheeled dolly 30 is being rolled onto a hydraulic lift 170. The floor 172 of the hydraulic lift 170 is generally flat but, as typical, the lift has surface inconsistencies such as slots 174. Other inconsistencies may include grating 176 or the like. The straight ramps 160 are generally flat so as to accommodate the casters rolling easily thereover. Additionally, the raised edges 164 help prevent the wheeled dolly from rolling off of a side edge. In FIG. 12, the straight ramps 160 are laid upon the vehicle lift floor member 172 in order to provide a pathway for the wheeled dolly to roll over slots 174 in the floor 172 without any problem.

As discussed above, Applicant contemplates a system in which one or a set of wheeled dolly bases 32 to which two or more different configurations of vehicle supports are selectively attachable so as to enable support of vehicles at a plurality of support locations, and also to be capable of supporting multiple makes and models of vehicles that may have different types of constructions at their support locations. Preferably the wheel dolly system also includes ramps such as discussed herein in order to provide a complete set of structures and features to allow a user to easily move disabled vehicles substantially anywhere around a user's work area safely and easily, and enabling the user to pass over and/or avoid obstacles to such vehicle movement.

Figure 13C:
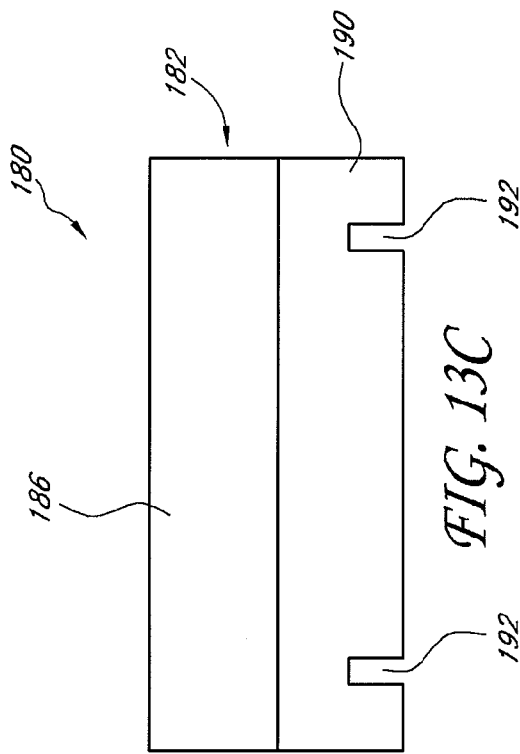
FIGS. 13A-C show perspective, end and side views, respectively, of an embodiment of a frame cradle adapted to be used in connection with the wheeled dolly configured as in FIG. 7.
Figure 13A:
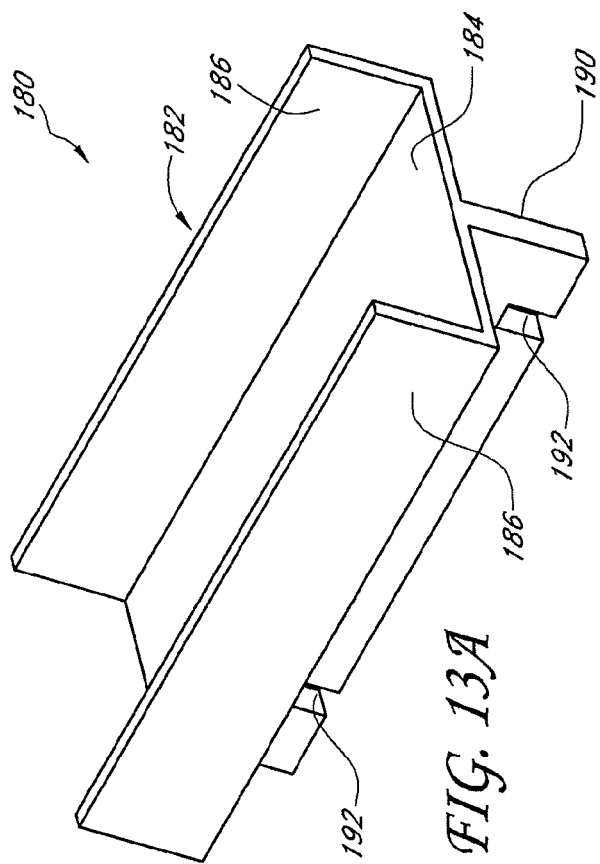
Figure 13B:
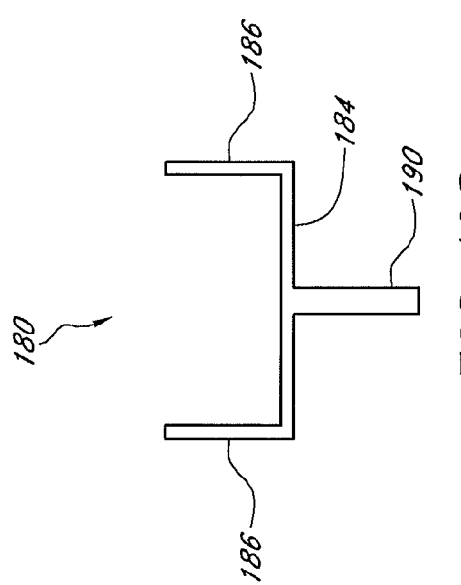

With reference next to FIGS. 13A-C, one embodiment of a further accessory to be used in connection with or as part of a support is illustrated. In this embodiment, a frame cradle 180 comprises an elongate body 182 having a bottom 184 and two upwardly-extending side walls 186. A flange 190 depends from the bottom 184. A pair of slots 192 are formed in the flange 190.

The illustrated cradle 180 is configured to be used with the body support 120 described above in connection with FIGS. 7-9. For example, to use the cradle 180, the flange 190 is fit in the space 140 between the first portions 136 of the body support engagement members 130. The flange slots 192 accommodate the bolts 142 so that the flange 190 is accommodated in the space 140, and the cradle bottom 184 rests upon the second portions 138 of the engagement member 130. The bolts 142 are then tightened so that the first portions 136 of the engagement member 130 engage the flange 190. As such, the cradle 180 is securely held by the engagement member 130.

Preferably, the cradle 180 is sized so that a vehicle frame, such as a truck ladder frame, rests between the side walls 186. Thus, this accessory enables the support 120 to be configured to accommodate a vehicle frame resting therein. In another embodiment, a securement member, such as a flexible strap, selectively extends across the opposing side walls 186 so as to even more securely hold the frame in the cradle 180.

In another embodiment, a cradle is configured having a flange with apertures that are spaced so as to be engageable with the engagement portions 96 of a hub support 80 such as described above in connection with FIGS. 4-6. In any case, as demonstrated, embodiments are contemplated in which multiple types of supports are available, and also accessories can be used in conjunction with certain supports to modify and/or enhance the function of the support.

Although this invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof. In addition, while a number of variations of the invention have been shown and described in detail, other modifications, which are within the scope of this invention, will be readily apparent to those of skill in the art based upon this disclosure. It is also contemplated that various combinations or subcombinations of the specific features and aspects of the embodiments may be made and still fall within the scope of the invention. Accordingly, it should be understood that various features and aspects of the disclosed embodiments can be combined with or substituted for one another in order to form varying modes of the disclosed invention. Thus, it is intended that the scope of the present invention herein disclosed should not be limited by the particular disclosed embodiments described above, but should be determined only by a fair reading of the claims that follow.

What is claimed is:

1. A system for temporarily supporting a vehicle having a plurality of vehicle support locations, the system comprising:
a generally rectangular dolly base having a longitudinal axis, a length of the dolly base along the axis being greater than a width of the dolly base transverse to the axis, the dolly base being supported by a plurality of wheels and having an upper surface, a pair of first connector portions defined on opposite sides of the longitudinal axis, and a pair of second connector portions defined generally along the longitudinal axis and spaced apart from one another, a distance between the first connector portions being less than a distance between the second connector portions;
a first support that is selectively attachable to the first connector portions of the dolly base, the first support having a pair of first support bases, each adapted to engage the upper surface of the dolly base at one of the first connector portions so that the first support bases are at least partially supported by the upper surface of the dolly base, the first support having a first engagement portion adapted to engage a first vehicle support location, the first support configured so that the first engagement portion is disposed between the pair of first connector portions;
a second support that is selectively attachable to the second connector portions of the dolly base, the second support having a pair of second support bases, each adapted to engage the upper surface of the dolly base at one of the second connector portions so that the second support bases are at least partially supported by the upper surface of the dolly base, the second support having a second engagement portion adapted to engage a second vehicle support location, the second support configured so that the second engagement portion is disposed between the pair of second connector portions; and
fasteners adapted to attach the first or second support bases to the corresponding first or second connector portions;
wherein the dolly can be selectively changed between a first configuration in which the first support is attached to the dolly base and a second configuration in which the second support is attached to the dolly base.

2. The system of claim 1, wherein the first vehicle support location comprises an elongate automobile pinch weld, and the first engagement portion comprises an elongate slot for accommodating the pinch weld, the elongate slot extending generally along the longitudinal axis of the dolly.

3. The system of claim 2, wherein the second vehicle support location comprises an automobile wheel lug bolt, and the second support comprises an arm extending from each support base, and the arms extend generally along the longitudinal axis of the dolly.

4. The system of claim 1, wherein one of the first and second supports comprises a pair of separately-formed support members, each support member having a base, an arm, and an engagement member.

5. The system of claim 4, wherein each support base of the one of the first and second supports is attached to the dolly base and the arms and engagement members are configured so that the engagement members cooperate to form the engagement portion of the support.

6. The system of claim 4, wherein the dolly base has an outer edge and a tilted upper surface, the tilted upper surface facing generally away from the outer edge, and each support member base of the one of the first and second supports is mounted to the tilted upper surface of the dolly base.

7. The system of claim 6, wherein the pair of support members are arranged generally in an A-frame configuration.

8. The system of claim 4, wherein engagement members of the one of the first and second supports are elongate and comprise generally flat engagement surfaces so that at least a portion of the vehicle support location is gripped between a pair of engagement surfaces.

9. The system of claim 4, wherein the engagement members of the one of the first and second supports each comprise an aperture for engaging a vehicle wheel lug bolt, and the first support member arm is rotatable relative to the support member base over a range of less than about 20°, wherein the support member base is configured to prevent further rotation of the support member arm.

10. The system of claim 1, wherein wheels are positioned at corners of the rectangular dolly base.

11. The system of claim 1, comprising a plurality of dollies, a plurality of first supports, and a plurality of second supports, wherein the dollies can be configured so that a plurality of dollies simultaneously are in one of the first and second configurations, and wherein a plurality of dollies can be attached to a single vehicle.

12. The system of claim 11 additionally comprising a bridge ramp having a ramp surface configured to accommodate a dolly rolling thereover, the bridge ramp having opposing ends and a crest, the crest being vertically higher than the opposing ends, wherein the bridge ramp provides a path for a loaded dolly to move over a raised obstacle without engaging the obstacle.

13. The system of claim 11 additionally comprising a ramp having a ramp surface configured to accommodate a dolly rolling thereover, the ramp having opposing ends and being substantially flat between the opposing ends, wherein the ramp is adapted to rest on a surface so as to provide a more advantageous path for a loaded dolly to move over than the surface upon which the ramp rests.

14. The system of claim 1 additionally comprising a first accessory adapted to selectively attach to one of the first and second supports so as to modify the configuration of the support, the first accessory configured to engage a different vehicle support location than the support to which the first accessory is attached.

15. The system of claim 1, wherein each of the support bases has an engagement surface that is generally complementary to the upper surface in the corresponding connector portions of the dolly base.

16. A system for temporarily supporting a vehicle, comprising:
a dolly base having opposing first and second ends and an upper surface, an inner portion of the dolly base being defined between the first and second ends, the upper surface being generally tilted relative to horizontal adjacent the first and second ends so as to be directed partially toward the inner portion of the dolly base, a first connector portion defined on the upper surface at or adjacent the first end, a second connector portion defined on the upper surface at or adjacent the second end;
a plurality of wheels supporting the dolly base; and
a detachable support that is selectively attachable to the dolly base, the support having a vehicle engagement portion and a pair of support base portions, the vehicle engagement portion adapted to engage a vehicle, the support base portions each having an engagement surface that is generally complementary to the upper surface of the dolly base so that when the support base portion is engaged with a corresponding one of the first and second connector portions, the support base engagement surface fits generally flush with the upper surface of the dolly and the support is at least partially supported by the dolly upper surface;
wherein the support base portions extend from their respective connector portions generally toward the inner portion of the dolly base so that the support has generally an A-frame configuration, and the vehicle engagement portion is disposed generally between the first and second ends of the dolly base.

17. The system of claim 16, wherein the dolly base is rectangular.

18. The system of claim 16, comprising a second detachable support having a second vehicle engagement portion and a pair of second support base portions, the second vehicle engagement portion adapted to engage a vehicle at a different vehicle location than the first vehicle engagement portion, the second support base portions each having an engagement surface that is generally complementary to the upper surface of the dolly base so that when the second support base portion is engaged with a corresponding one of the first and second connector portions, the second support base engagement surface fits generally flush with the upper surface of the dolly and the second support is at least partially supported by the dolly upper surface.

19. The system of claim 16 additionally comprising a plurality of fasteners adapted to attach the support base portions to corresponding ones of the first and second connector portions.

20. The system of claim 16, wherein the upper surface is generally flat in the first and second connector portions.

* * * * *